June 27, 1939.  H. W. PRICE  2,164,164
CARBON BLACK AND METHOD OF TREATING SAME
Original Filed Dec. 21, 1933
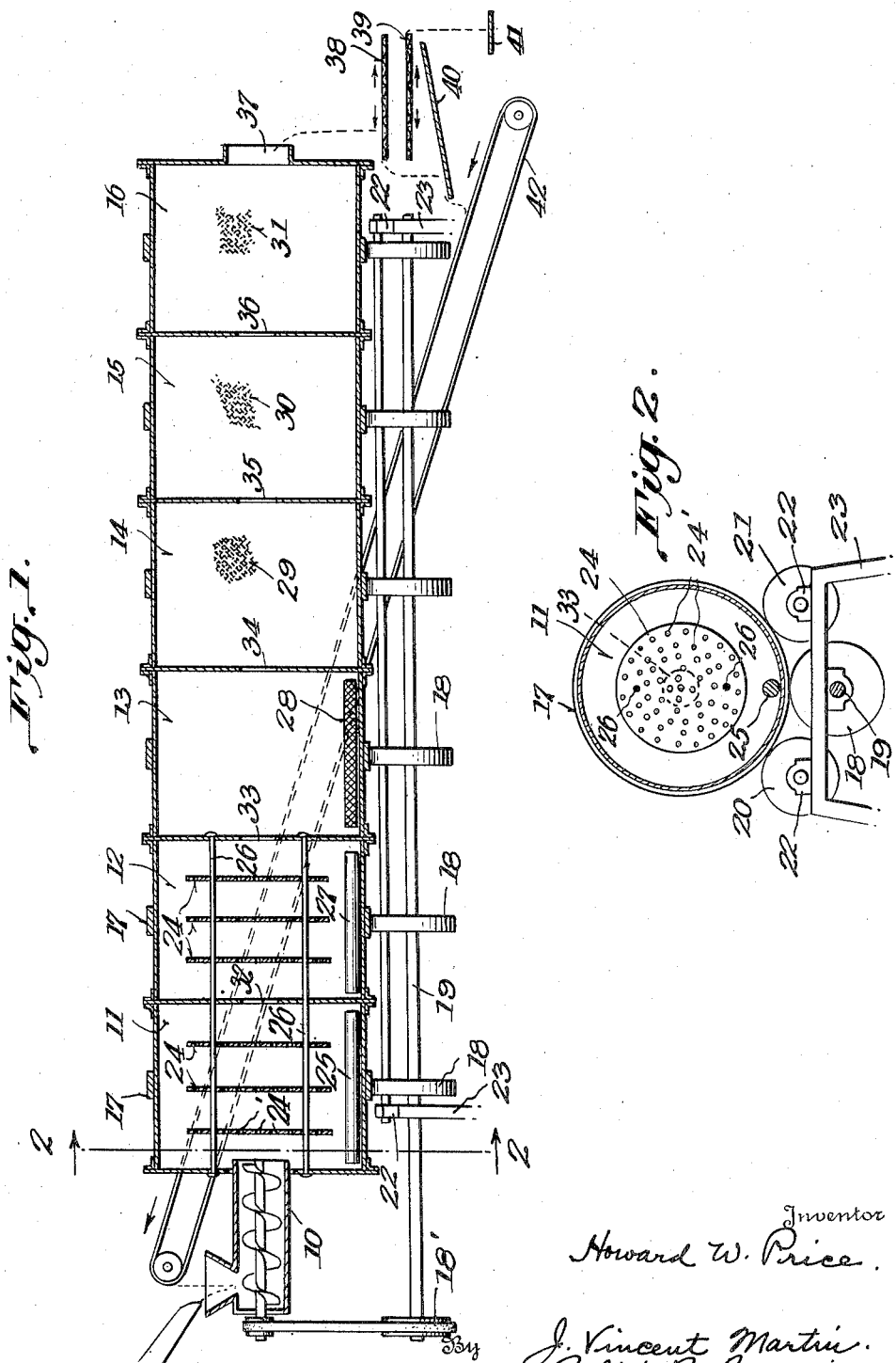

Patented June 27, 1939

2,164,164

UNITED STATES PATENT OFFICE 2,164,164

CARBON BLACK AND METHOD OF TREATING SAME

Howard W. Price, Borger, Tex., assignor, by mesne assignments, to J. M. Huber Corporation, Borger, Tex., a corporation of Delaware Continuation of application Serial No. 703,402, December 21, 1933. This application December 28, 1935, Serial No. 56,481

10 Claims. (Cl. 134—60)

In commercial form there are at present manufactured many fine powders in a dry or practically dry state such as precipitated magnesium carbonate, calcium carbonate, zinc oxide, barium sulphate, talcs, clays, and various forms of carbonaceous blacks known as carbon black or channel gas black, lamp black and other carbons manufactured by the decomposition of carbonaceous gases and used for compounding with various substances such as rubber compounds, paints and varnishes, printing inks, sound recording material and various wax and resinous pyroxylins.

A well recognized difficulty in handling all of these fine powders is that they sift through the containers used to confine them. Moreover, when packed in barrels or paper sacks, an excessive dusting occurs when the products are being used or mixed with other ingredients, and as a result the area surrounding the point or points of handling is filled with dust which settled on surrounding objects, contaminates other products and pollutes the air which those working with the product have to breathe.

Carbon black is illustrative of this type of material and of the difficulties encountered in making and using it. This product is particularly hard to handle due to the fact that it is a very light and finely divided material composed of amorphous carbon particles and without any binder. As it comes from the decomposition houses and through various bolting and sifting apparatus, it has a weight of only two to four pounds per cubic foot.

Before this black is packed into commercial containers, usually paper bags, it is customarily placed in suitable bins, having within them revolving shafts to which are attached blades or pins. In these bins the black is agitated or stirred to agglomerate the particles and to increase their weight per cubic foot by disassociating from the particles the air and gases which have become entrained in them.

It has been common practice in the carbon black art to carry out this bin agitation to a point where the black assumes an approximate weight from twelve to fifteen pounds per cubic foot in order to put the product in a form wherein it may be more readily handled and shipped. With this agitation there may be produced a granular product which, although suitable for use where heavy milling or mixing equipment is available, is not always desirable for incorporation in certain oils and varnishes as are used in the paint and ink trades. This type of agitation is susceptible to improvement, however, as a means for obtaining granular carbon black, for the reason that it entails considerable expenditure of time, labor and power and requires close attention to factors which may cause the material to become overheated and catch fire.

For the purpose of compounding with other more viscous materials such as rubber, where large quantities are used, it has been customary to compress the carbon black obtained from the bin agitators by means of heavy hydraulic or mechanical presses to a state where its weight is from twenty to thirty pounds per cubic foot. This briquetting process is of advantage to prevent sifting and dusting in handling, as well as to reduce the amount of storage space required, although it involves a number of disadvantages as will hereinafter appear.

Practically all modes of handling black require a preliminary bin agitation such as that briefly referred to above. This method of prolonged stirring in order to eliminate entrained air and gases is almost uniformly used as a preliminary procedure for any process in which the carbon black particles are mechanically treated.

Further to reduce the density of the black to facilitate easier handling, to reduce storage space, and to produce a firmer agglomeration of the particles to minimize dusting, several methods are in use.

One such method is to subject the carbon black to what is termed multi-directional pressure by violently agitating and compressing it, thereby causing the particles to be hammered into aggregates of spherical form. This is in reality an extension of the bin agitation principle and although the resultant product may sometimes be found to be satisfactory, the process requires high speed machinery and a large amount of power, thus making it expensive, particularly as only limited quantities of carbon black can be treated at one time in the apparatus necessitated by this procedure. The clearances between the various moving parts of the apparatus used in this treatment, as well as other conditions, require extremely fine adjustment and control which are obtained and maintained with difficulty, and unless these various conditions are properly regulated, the aggregates are likely to become broken up and sheared, with little or no benefit having been derived from the treatment. Moreover, the high speeds necessary properly to agitate the carbon black particles by this method are likely to cause an excessive frictional heat to be developed in the carbon black charge, thus creating the danger of losses by fire.

As previously indicated, it has also been common practice in the art to utilize various means in order to apply heavy pressures to aggregates of carbon black in order to compress them. This procedure, although it does not overcome the disadvantages of handling the dusty carbon black preparatory to compression, does reduce the volume of the black as well as its tendency subsequently to "dust", and carbon black in this compacted condition is commercially sold, having a density close to twenty-five pounds per cubic foot. Often the black is compressed in bags or other containers which become wrinkled and crimped during the pressure treatment, thus trapping a considerable quantity of carbon black in the wrinkles, and this entrapped black can only be removed by violent shaking and then only at the expense of a cloud of dust. It is obvious that the application of heavy pressures involves heavy and expensive machinery, a large amount of power, increased expense and delay in preparing the product for shipment, while the product is very likely to be caked so hard that it is difficult to disperse or to mix it with other material.

Another mechanical procedure used to render carbon black more dense and capable of being more easily handled is the application of pressure by passing it through rollers of a Wheatley press. This procedure is carried out after an initial bin agitation which brings the product down to a density of from twelve to fifteen pounds per cubic foot, and involves compressing the black in a screw conveyor and delivering it to and passing it through several pairs of rollers capable of pressing and consolidating it. Such a procedure, although possessing the advantages of continuity of treatment, produces hard flakes which do not readily break down, as on a rubber mill, and which must be forced through a screen to break the flakes apart again, and this usually involves the production of a considerable quantity of the same fine dust which was originally sought to be avoided. Moreover, the amount of black which can be passed through one machine of this type is limited and production is retarded to this extent.

There have been other methods suggested of reducing the apparent density and dustiness of carbon black, notably those involving the addition of tarry binders and by wetting the charge with a suitable agent or agents. These methods, however, are not strictly mechanical in nature and will, therefore, not be discussed in detail. The present invention is essentially a mechanical treatment and will be seen to contrast sharply with previously proposed methods of mechanically treating carbon black in order to retain its desirable characteristics but to eliminate its undesirable ones. To retain these desirable features and to eliminate these undesirable ones is one of the objects of the present invention.

Another object of the invention is to provide a process simple and economical of accomplishment and efficient in result.

Another object is to produce a product of increased density, soft, dustless, easy to handle and capable of being readily dispersed in or intermixed with the material with which it is customarily used.

I have discovered that it is possible to change carbon black to a dense, free-flowing, non-dusting state of agglomeration by a continuous process, without placing it in or passing it through presses and without preliminary or violent agitation. This may be done quickly and continuously while advancing the black through a predetermined course within a revolving drum or drums in certain of which are included a series of relatively light, free rollers. After being subjected to this treatment the particles become agglomerated into a product of the desired density.

The preferred procedure of the present invention comprises taking the black just as it comes from the bolting or sifting apparatus without initially stirring or agitating it in bins, as explained above, where heretofore it was required to be brought to a density of approximately twelve to fifteen pounds per cubic foot before it was ready for further processing. Agitated black may, however, be used. The black is subjected to a progressive moderate pressing, rolling and tumbling of the particles as by tumbling them down inclined surfaces and simultaneously lightly pressing them under a freely movable roller, and then tumbling them without pressing. Such tumbling must be carefully regulated, however, so that successive increments of the total mass are allowed to pass over surfaces whose movement and inclination with the horizontal is such as to cause the mass passing over each surface slowly to flow and to shift over itself, and so that each such mass is simultaneously lightly pressed and compacted at any given time under the rolling and pressing forces of a single rolling member freely movable through the same and rotatable therein. Expressed in another way, the black is flowed over successive surfaces that are so moved and inclined that the body of each separate increment of black, within which each freely movable rolling member is contained, is slowly raised to a point where the top portion thereof is caused to flow downwardly by gravity and is thus kept in a constant state of slow disturbance or motion so that it is unable to come to rest at its normal angle of repose. After successive increments have been so treated, they are subjected to a like regulated tumbling without the rolling and pressing forces of the rolling member within the mass. This treatment effects a continuous gentle compacting pressure by virtue of which the black can be processed continuously and brought directly to an apparent density of twenty-five or more pounds per cubic foot. This gentle compacting pressure is exerted on the black solely as the result of gravitational forces and may be seen to involve a treatment of the particles in an unconfined state, without the use of heavy confining pressure or impact and the treatment effects the densification and agglomeration of the particles. These agglomerates may easily be separated into coherent polyhedral agglomerates of a size that can be handled without dusting. The process is continuous and, therefore, well adapted to quantity production, and separate preliminary or accessory treatments and their accompanying cost, equipment and labor are unnecessary. The product is of a substantially uniform standard of quality and well adapted to "flow" without dusting; it is compact and easily handled without substantial loss by dispersion in air, and is readily dispersible or miscible with the types of ingredients with which agglomerated carbon black is ordinarily used.

Referring to the drawing in which is illustrated diagrammatically an exemplary combination of instrumentalities capable of enabling the process of the invention to be carried out, Fig. 1 is a side elevation, partly in section, and Fig. 2 is a section along the line 2—2 of Fig. 1.

As previously indicated, the method of the present invention may be accomplished by passing the loose carbon black through a series of drums rotating together. The drums may be conceived as a single drum divided up into a series of chambers as indicated in Fig. 1, but, of course, may be independent as to both construction and operation. In Fig. 1 the carbon black is fed to the drum as at 10 which indicates a screw conveyor. The drums 11, 12, 13, 14, 15 and 16 are preferably secured together and rotated on a number of rollers, two of which are shown in Fig. 2 at 20 and 21. These rollers may be carried by shafts mounted on bearings 22 supported by any suitable framework 23. Rotation may be accomplished by providing rollers 18 secured to a shaft 19, driven from any suitable source of power (not shown), or it may be accomplished by applying power to one of the shafts on which rollers 20 or 21 are mounted. A pulley 18' may be arranged to drive the screw of the conveyor 10 as indicated in Fig. 1. The rollers 18 may be arranged frictionally to contact against tires 17 which may be secured around the outer surfaces of the drums as indicated in Fig. 1.

Within the first and second drums 11 and 12 are provided relatively long, light rollers 25 and 27 of wood, rubber surfaced metal or other suitable material, adapted to roll about the inner surfaces of the drums as they rotate. Baffles 24 may be secured in the drums by rods 26 in order to inhibit the flow of dusty powder from one drum to another. Baffles may be provided with openings 24' to prevent the material from becoming packed between the baffles and thus obstructing passage into the next drum.

Drum 13 may be provided with a roller 28 of relatively small diameter consisting of a wire screen having suitable openings, for instance, a screen of one-half inch mesh. Roller 28 may, however, be a solid roller of the nature previously described.

Drums 29, 30, 31 contain no rollers and may be lined with wire mesh, for instance, one-half inch wire mesh, in order to roughen the walls for the purposes described.

Openings 32, 33, 34, 35, 36 and 37 in the partitions or walls between the chambers or drums are provided, of sufficient size to permit the continuous flow of material from one end of the apparatus to the other, and this occurs as a "head" is built up in the feeding end, due to the flow of material through screw conveyor 20. It will be observed that the partitions serve to limit the longitudinal movement of the rollers within the drum and to localize their action to an extent which will prevent the treated material from flowing too quickly from their zone of action. The partitions may, therefore, be made so that relatively large openings 32, 33, etc., are provided.

Underneath the opening 37 there may be provided suitable shaker screens 38 and 39 agitated by any suitable means, not shown. These screens are arranged selectively to separate the carbon aggregates as they are delivered from the last chamber 16. For instance, screen 38 may be 20 mesh; screen 39, 65 mesh; while 40 may be a solid surface for collecting the particles which pass through the two screens. It should be noted, however, that the necessity for screening the material may be dispensed with by proper regulation of the conditions of the process, and a subsequent screening of the particles is, therefore, not to be considered an essential feature of the invention.

By reference to screens of different mesh I refer to meshes per inch of standard screens. Thus, a 20 mesh screen has a square opening of about .033 linear inch on a side, while a 65 mesh screen has a square opening of about .009 inch on a side.

With the exemplary mechanisms the process proceeds as follows:

The flocculent black is fed continuously into the chambers through delivery 10 and the drums slowly rotated, say at 6 to 10 R. P. M. Preferably, the material is maintained in all the drums so that each one is somewhat less than one-half full in order to allow the particles the maximum distance of travel compatible with efficient quantity production. As the drums rotate, successive increments of the mass of black are treated in each compartment. As the inner surface of each compartment moves slowly in the arc which defines its orbit, the inclination of a given area of such surface gradually increases its angle with the horizontal and continually approaches and exceeds the angle at which the top portion of the carbon black seeks to assume a state of repose. The moving and inclined surfaces thus cause the black to flow and shift slowly by gravity. During this operation the black is lightly pressed, rolled and compacted under rollers 25, 27 and 28, the air and gases entrained in the black substantially eliminated, and its density increased.

The inner surfaces of the last series of compartments act similarly except the pressing, rolling and compacting action of the freely movable and rotatable members 25, 27 and 28 is omitted. Thus, the black is subjected, as successive increments thereof pass through the last few compartments, to a further slow gravitational flowing and shifting in the nature of a regulated tumbling action, which, in the absence of the rollers, facilitates the formation of granules.

It will be apparent that as the drum assembly rotates, the particles are first made more dense and afterwards collect in the form of agglomerates by reason of the continuous gentle compacting, rolling and regulated tumbling action to which they have been subjected, and they gradually pass from chamber to chamber until they emerge at 37 and drop down on a conveyor or upon shaker screens 38 and 39. When the treated material emerges at 37, the whole mass has been converted to aggregates which are quite compact and which possess considerable uniformity in size. In the instance illustrated, when these aggregates drop from the opening 37, they fall on screen 38 which allows particles smaller than 20 mesh to pass through, and screen 39 allows particles smaller than 65 mesh to pass through and collect upon plate 40. Particles which fail to come through the 20 mesh screen are usually undesirable because they are too large, and the particles which come through the 65 mesh screen and collect on plate 40 are generally too small. However, those which remain on the 65 mesh screen are of the desired size and in the instance illustrated will be of a size ranging from 20 to 65 mesh. These are removed and collected as at 41 preparatory to packing and shipping. The undesirable particles are removed to a conveyor as at 42 and brought back to the delivery end of the apparatus so that the large particles may be again subjected to treatment and brought down to the required size while the smaller ones may be built up into the desired agglomerates by further agitation in accordance with the process.

I have discovered that by subjecting the carbon black to a process as described, the particles between 20 and 65 mesh comprise a substantial proportion of the total amount, and as these are of a size eminently suitable for the purposes of the invention, it is apparent that a single treatment is very efficient in achieving its purpose.

The product of the invention as applied to carbon black comprises agglomerates of a substantially uniform nature, and come within a substantially uniform range of size. The individual agglomerates seem somewhat spherical in contour but on close examination are found to be of irregularly polyhedral shape, the surface being extremely irregular and indented by craters. They are, however, coherent to the extent of being capable of holding together under stresses of the order of those caused by handling, as during packing transportation, although they may be easily broken down under increased stresses, as in a rubber mill, Banbury mixer or any other of the devices ordinarily used to disperse or mix it with other material. This may be due to the rough exteriors of the agglomerates, which enable the mill rolls or agitating blades of commercial mixing equipment to obtain a good "bite" upon the carbon black, thus increasing the ease with which it may be broken down and facilitating its proper intermixture with the materials with which such mixture is desired. The product "flows" without substantial dusting and may be produced to give an apparent density of twenty-five to thirty pounds per cubic foot.

While the angular speed of the drums required to accomplish the gentle tumbling steps of the process has been given as 6 to 10 R. P. M. in order to depict an illustrative embodiment of the invention, it should be borne in mind that the speed of revolution should be adjusted as required by the conditions of a given case, as will be apparent to a person skilled in the art. The principle which governs such adjustment is that the drum should not rotate so fast that the carbon black is carried upwardly and caused to cascade back into the center of the mass, but only fast enough so that it will shift by gravity around the lower region of the drum and thus be subjected to the gentle compacting pressure sought to be imparted.

In general, the size and weight of the rollers 25, 27 and 28 and the speed of revolution of the drum are so related that the rollers will not be carried upwardly more than approximately 60° of arc.

While, also, the invention has been illustrated as carried out with a particular set of instrumentalities, it is obvious that the principles of the process may be utilized in other ways and forms without departing from the scope thereof.

This application is a continuation of applicant's copending application Serial No. 703,402, filed December 21, 1933.

Having thus described my invention, what I claim is:

1. The process of treating carbon black which consists of continuously advancing a mass of black along a predetermined path and while so doing first allowing successive portions of said mass to shift slowly by gravity over moving surfaces which gradually increase their angle with the horizontal, and simultaneously lightly pressing and compacting said portions under the rolling and pressing forces exerted by a single rolling member freely movable therethrough and rotatable therein as they shift downwardly over said surfaces, and thereafter continuing to shift increments of the mass by gravity as aforesaid without subjecting the same to any pressure other than that resulting from their own weight, until the entire mass forms into relatively tenacious, self-sustaining granules.

2. The process of treating carbon black which consists of continuously advancing a mass of black along a predetermined path and while so doing first allowing successive increments of said mass to shift continuously by gravity over separate surfaces so moved and inclined that they continually approach and exceed the angle of repose of the respective increments of said black, and simultaneously lightly pressing and compacting the said increments under the rolling and pressing forces exerted by a single rolling member freely movable therethrough and rotatable therein as they shift downwardly over said surfaces, and thereafter continuing to shift portions of the mass by gravity as aforesaid without subjecting the same to any pressure other than that resulting from the weight of such portion, until the entire mass forms into relatively tenacious, self-sustaining granules.

3. The process of treating carbon black which consists of continuously advancing the black along a predetermined path and while so doing first allowing successive portions of the total mass of black to shift slowly by gravity across a surface by varying the inclination of such surface so that it approaches and exceeds the angle of repose of said black, and simultaneously lightly pressing and compacting said successive portions under the rolling and pressing forces exerted by a rolling member freely movable therethrough and rotatable therein as the same shift downwardly over said surface, and thereafter continuing to shift the mass by gravity as aforesaid without subjecting the same to any pressure other than that resulting from its own weight, until the entire mass forms into relatively tenacious, self-sustaining granules.

4. The process of treating carbon black which consists of continuously advancing the black along a predetermined path and while so doing shifting separate masses of black by flowing said masses over successive surfaces moving in such fashion and at such speed that the masses are continually carried upwardly and allowed to flow back slowly by gravity, and simultaneously lightly pressing and compacting said masses under the rolling and pressing forces exerted by a rolling member freely movable therethrough and rotatable therein as they shift downwardly over each of said surfaces, and thereafter continuing to shift the mass by gravity as aforesaid without subjecting the same to any pressure other than that resulting from its own weight, until the entire mass forms into relatively tenacious, self-sustaining granules.

5. The process of treating carbon black which consists of continuously advancing a mass of back in the dry state along a predetermined path and while so doing first allowing successive portions of said mass to shift slowly by gravity over moving surfaces which gradually increase their angle with the horizontal until they exceed the angle of repose of said black, and simultaneously pressing and compacting said portions under the rolling and pressing forces exerted by a single rolling member freely movable therethrough and rotatable therein as they shift downwardly over said surfaces, and thereafter continuing to shift increments of the mass by gravity as aforesaid without subjecting the same to any pressure other than that resulting from their own weight, until substantially the entire mass forms into relatively tenacious, self-sustaining granules.

6. The process of treating carbon black which consists of continuously advancing a mass of black in the dry state along a predetermined path and while so doing first allowing successive increments of said mass to shift continuously by gravity over separate surfaces so moved and inclined that they continually approach and exceed the angle of repose of the respective increments of said black, and simultaneously pressing and compacting the said increments under the rolling and pressing forces exerted by a single rolling member freely movable therethrough and rotatable therein as they shift downwardly over said surfaces, and thereafter continuing to shift portions of the mass by gravity as aforesaid without subjecting the same to any pressure other than that resulting from the weight of such portions, until substantially the entire mass forms into relatively tenacious, self-sustaining granules.

7. The process of treating carbon black which consists of continuously advancing the black in the dry state along a predetermined path and while so doing first allowing successive portions of the total mass of black to shift slowly by gravity across a surface by varying the inclination of such surface so that it approaches and exceeds the angle of repose of said black, and simultaneously pressing and compacting said successive portions under the rolling and pressing forces exerted by a rolling member freely movable therethrough and rotatable therein as the same shift downwardly over said surface, and thereafter continuing to shift the mass by gravity as aforesaid without subjecting the same to any pressure other than that resulting from its own weight, until substantially the entire mass forms into relatively tenacious, self-sustaining granules.

8. The process of treating carbon black which consists of continuously advancing the black in the dry state along a predetermined path and while so doing shifting separate masses of black by flowing said masses over successive surfaces moving in such fashion and at such speed that the masses are continually carried upwardly beyond their angle of repose and allowed to flow back slowly by gravity, and simultaneously pressing and compacting said masses under the rolling and pressing forces exerted by a rolling member freely movable therethrough and rotatable therein as they shift downwardly over each of said surfaces, and thereafter continuing to shift the mass by gravity as aforesaid without subjecting the same to any pressure other than that resulting from its own weight, until substantially the entire mass forms into relatively tenacious, self-sustaining granules.

9. The process of treating flocculent carbon black which comprises continuously advancing said black in a dry state along a predetermined path while shifting said black on a slowly moving surface that continually approaches and exceeds the angle at which the top portion of the mass of black tends to assume a state of repose and subjecting said black to the comparting pressure of a rolling member during an initial portion of the progress of said black along said path and thereafter continuing said shifting of said black without the compacting pressure of the rolling member until relatively tenacious self-sustaining granules are formed.

10. The method of treating light, flocculent carbon black by gravitational forces which comprises advancing said black along a predetermined path at the same time subjecting the particles thereof in the dry state, first, to a compacting pressure under rollers maintained in spaced relation to each other while simultaneously tumbling the same by continually slowly raising increments of the mass to a point where the top portions thereof shift by gravity by reason of their inability to reach a state of repose, and thereafter continuing said tumbling without said compacting pressure until relatively tenacious self-sustaining granules are formed.

HOWARD W. PRICE.